United States Patent [19]

Smith

[11] Patent Number: 4,845,411

[45] Date of Patent: Jul. 4, 1989

[54] BRUSHLESS DC MOTOR AND ENCODING TECHNIQUE

[75] Inventor: Norman Smith, Woodstock, N.Y.

[73] Assignee: Rotron, Incorporated, Woodstock, N.Y.

[21] Appl. No.: 103,436

[22] Filed: Sep. 30, 1987

[51] Int. Cl.$^4$ .......................................... H02K 29/08
[52] U.S. Cl. ................................... 318/254; 318/138; 318/439
[58] Field of Search ........................ 318/138, 254, 439

[56] References Cited

U.S. PATENT DOCUMENTS

| | | | |
|---|---|---|---|
| 3,924,167 | 12/1975 | Clark et al. | 318/254 |
| 3,988,654 | 10/1976 | Takahashi et al. | 318/254 |
| 4,130,769 | 12/1978 | Karube | 318/138 X |
| 4,158,795 | 6/1979 | Tarumi et al. | 318/138 |
| 4,311,933 | 1/1982 | Riggs et al. | 310/156 |
| 4,329,636 | 5/1982 | Uchida et al. | 318/721 |
| 4,479,078 | 10/1984 | Kidd et al. | 318/254 |
| 4,481,440 | 11/1984 | Muller et al. | 310/268 |
| 4,510,422 | 4/1985 | Ogura | 318/254 |
| 4,641,066 | 2/1987 | Nagata et al. | 318/254 |
| 4,665,350 | 5/1987 | Angi et al. | 318/439 X |

OTHER PUBLICATIONS

"In IC Form, Hall-Effect Devices Can Take on Many New Applications", Electronics/Aug. 2, 1971, pp. 46-49.

"Torque Motor Handbook and Product Selection Guide", Litton Industries, Clifton Precision, 1983, pp. 3-1 to 3-5.

Peter Wood and Duncan Grant, "Hexfets Hybrid Packages Make Compact Motor Drives", PCI Oct. 1985 Proceedings, pp. 278-291.

*Primary Examiner*—Bentsu Ro
*Attorney, Agent, or Firm*—Brumbaugh, Graves, Donohue & Raymond

[57] ABSTRACT

A brushless DC motor has no poles. Every 180° electrical 3 coils, each a portion of a total winding, are wound onto the stator in 3 slots and in overlapping fashion. The overlapped portions of the coils are wound in the same flux creating direction. The windings are connected at a central, floating connection. Transistors connected to the remaining ends of the windings direct current to or from the windings so that two coils are always conductive in every 360° electric arcuate length of stator. Hall devices 120° electrical apart have their outputs fed to a logic, commutation circuit that decides, based on rotor positions, which of the transistors to cause to conduct.

7 Claims, 3 Drawing Sheets

| ROTOR POSITION IN DEGREES MECHANICAL | $H_1$ STATE | $H_2$ STATE | $H_3$ STATE | CURRENT FLOW |
|---|---|---|---|---|
| 0–60° | 0 | 1 | 0 | 18 TO 17 ($B_1$ & $A_2$ HIGH) |
| 60–120° | 0 | 1 | 1 | 18 TO 19 ($B_1$ & $C_2$ HIGH) |
| 120–180° | 0 | 0 | 1 | 17 TO 19 ($A_1$ & $C_2$ HIGH) |
| 180–240° | 1 | 0 | 1 | 17 TO 18 ($A_1$ & $B_2$ HIGH) |
| 240–300° | 1 | 0 | 0 | 19 TO 18 ($C_1$ & $B_2$ HIGH) |
| 300–360° | 1 | 1 | 0 | 19 TO 17 ($C_1$ & $A_2$ HIGH) |

BRUSHLESS DC MOTOR AND ENCODING TECHNIQUE

BACKGROUND OF THE INVENTION

The present invention relates to the combination of a brushless DC motor and encoded drive circuit and more particularly to such a combination in which the arcuate length and numberof rotor magnet poles, the manner of connection of multiphase stator windings and the encoded sequence of energization of the windings cooperate to produce a more efficient and better operating motor.

Recently six-transistor, encoded integrated circuits have been made available and have been proposed for brushless DC motors. These circuits permit "full wave" excitation of each winding, i.e., current flow in forward and reverse directions. Previous three-transistor stator winding energization circuits permitted only "half wave" excitation, current flow in one direction only. THe six-transistor circuits have been proposed for four-pole, three-phase brushless DC motors. See for example, "Hexfets in Hybrid Packages Make Compact Motor Drives," P. Wood and D. Grant, Proceedings of PCI, October 1985. The art, however, has not made full advantage of these encoded, six-transistor drive circuits such that each stator winding is energized through a larger mechanical rotor angle to contribute to the torque produced and fewer slots are utilized in the stator lamination stack whereby more magnetic material is present to conduct flux, thus improving efficiency. This is particularly true in small brushless DC motors where the number of slots takes on greater significance in the smaller diameter stator stock.

With higher speed brushless DC motors it is, moreover, desirable to decrease the number of switching occurrences per rotor revolution because switching losses reduce efficiency and with higher speeds occur more frequently. A typical four-pole, three-phase brushless DC motor utilizes three Hall devices angularly spaced at 30° or 60° mechanical to produce 12 commutations for every 360° mechanical.

SUMMARY OF THE INVENTION

In a brushless DC motor in accordance with this invention several Hall devices are arranged proximate the path of rotation of a fewer number of rotor magnets, and logic circuitry responds to the conditions of the Hall devices to determine when and in what direction a multiple transistor drive circuit should apply energizing voltage to cause current flow in windings that are wound and connected so as to be energized through a greater angular sweep of the rotor than ordinarily occurs for a brushless DC motor of that number of windings.

More particularly the motor has n permanent magnet rotor poles, 120° electrical in length and spaced 60° electrical apart, the motor's stator has 3n winding coils each 180° electrical wound in slots spaced 60° electrical apart. A Hall device is located each 120° electrical. A logic decoding circuit serves as a commutation circuit to decide, based on the Hall outlets, which winding coil is to be energized and when. The decoding circuit controls a transistor energizing circuit coupled to the free ends of windings that are connected together at a single central floating connection. The transistor energizing circuit has plural transistors connected to each winding so that direct current can be directed to or from the winding depending upon which transistor is forward biased under the control of the decoding circuit. The winding coils are energized in overlapping periods corresponding to rotor movement through 240° electrical. During the period of conduction of one winding coil, another coil ceases to conduct the current therefrom (or thereto) while yet another coil begins conduction of the current in association with the first mentioned coil. Preferably the coils are overlapped spacially and wound in the same flux-creating direction, i.e., so that when energized the flux created by the coils where they overlap is additive. Also preferably, the coils are halves of windings and the halves are wound, say, 180° mechanical apart in the same fashion so that a similar energization sequence simultaneously occurs at the location 180° mechanical distant. The coils that are the halves of the windings may be wound such that each simultaneously creates appropriate torque contributing flux depending upon whether stator segments on which they are wound are creating torque with respect to similar or dissimilar magnetic rotor poles.

Specifically, in a two-pole, three-phase brushless DC motor, three Hall devices, preferably latching Hall switches, spaced 120° mechanical (120° electrical) apart, vary their output from high to low, and then from low to high with passage of the leading edge of first one and then another of the pair of rotor magnets to provide all of the positional information necessary for logic circuitry to control the application of excitation current by a six-transistor drive circuit to pairs of a Y-connected three-phase stator windings whose center interconnection floats, unconnected to ground or other input voltage connection. The windings are wound in a six slot stator stack. Each winding has two halves forming coils wound onto the stator 180° mechanical apart. Each winding conducts in one direction during 120° mechanical of rotor rotation and then in the other direction during another 120° mechanical of rotor rotation. In other words, each winding contributes to torque production during greater than 50% of each rotation. The resulut is a more efficient motor.

BRIEF DESCRIPTION OF THE DRAWINGS

The above and further advantages of the invention will be better understood with reference to the following detailed description of a preferred embodiment taken in consideration with the accompanying drawings, in which.

DETAILED DESCRIPTION OF THE PREFERRED EMBODIMENT

Figure 1:
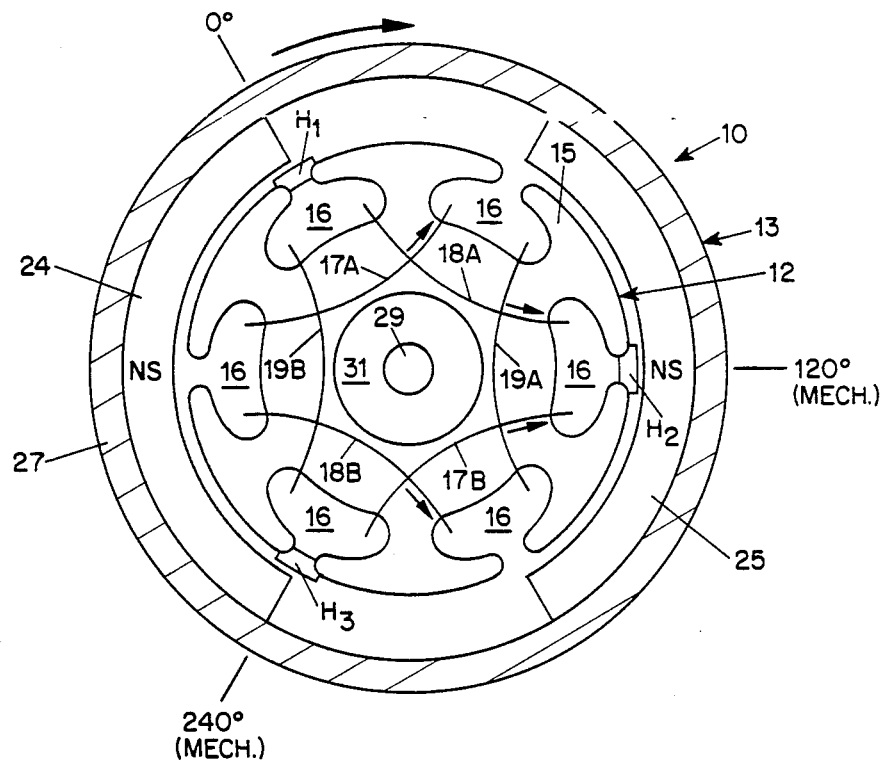
FIG. 1 is a diagrammatic illustration of an external rotor brushless DC motor rotor and stator and shows rotor magnets, Hall switches, and a six-slot stator stack with three-phase windings wound thereon.
Figure 2:
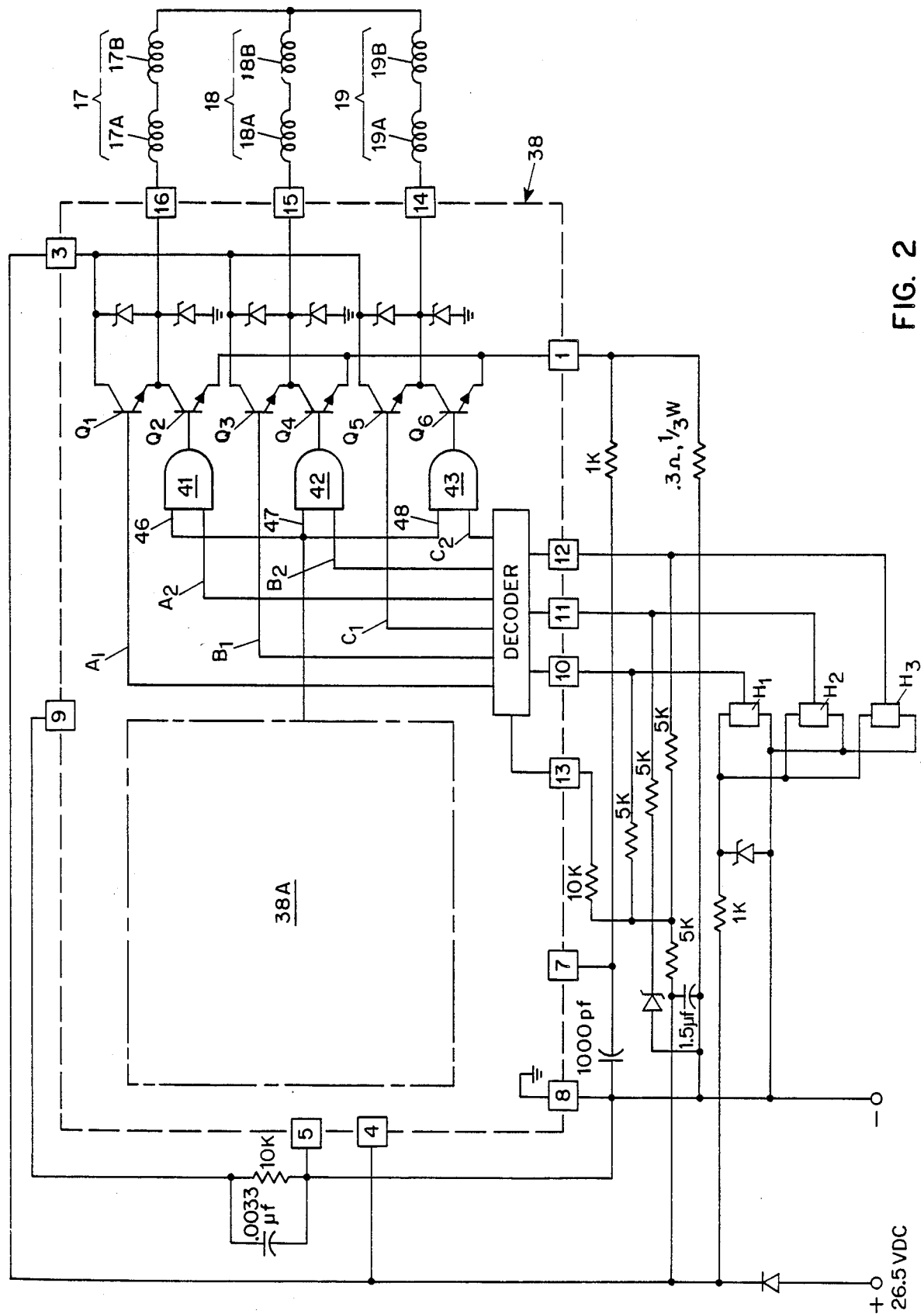
FIG. 2 is a schematic illustration of circuitry associated with the brushless DC motor of FIG. 1 and shows interconnections of Hall switches, logic circuitry, a six-transistor drive circuit and Y-connected three-phase stator windings.

Referring now to the drawings in detail, in FIG. 1 a two pole, three phase brushless DC motor 10 has an inner stator 12 and outer rotor 13. The stator 12 has a lamination stack 15 defining six slots 16. Three windings 17, 18 and 19 form the three phases of the motor 10. The windings are wound in halves 17A and 17B, 18A and 18B, and 19A and 19B. Each half is shown in FIG. 1 as a single turn for easy recognition, but is a multiple turn coil. The halves of each winding are wound onto the stator 180° mechanical (or 180° electrical) apart. The windings are Y-connected as shown as shown in FIG. 2, with the central connection floating, which is to say ungrounded and without direct connection to an input voltage source. Energization of the windings by correctly sequenced application of the excitation voltage across pairs of winding ends 17C–18C, 18C–19C, or 19C–17C thus always effects current flow through two windings, 17 to 18, 18 to 19, or 19 to 17.

The rotor 13 shown in FIG. 1 has two oppositely radially magnetized arcuate permanent magnet segments 24 and 25 contained in a cup or backiron 27 of steel or other flux conducing material. Each of the arcuate magnets 24 and 25 is 120° mechanical (or 120° electrical) in arcuate length, and the two are spaced apart 60° (60° el.) between their respective ends. A shaft 29 affixed centrally to the cup 27 supports the rotor 13 for rotation in a bearing or bearings 31.

Figures 3, 3A:
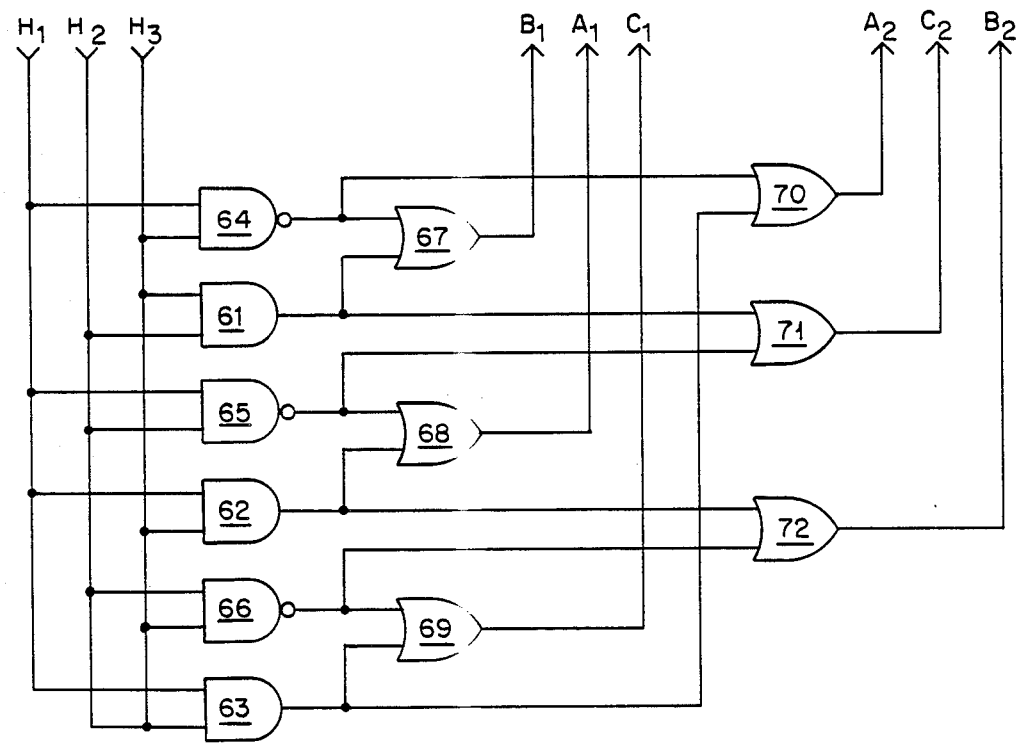
FIG. 3 is a table of Hall switch conditions and winding conduction conditions throughout a complete rotor rotation.
FIG. 3A is a schematic diagram of a logic circuit suitable to act as the commutation circuit in the motor according to FIG. 1.

To sense the rotational location of the rotor and to control the commutation or timing of current flow in the stator windings, Hall detectors $H_1$, $H_2$, and $H_3$ of FIG. 1 are commercially available latching Hall switches that respond to the proximity of a south magnetic pole of sufficient field strength to assume one of its two output states ("1" or "0") until a sufficiently strong north magnetic pole comes into proximity with the device to change the output state. The Hall switches $H_1$, $H_2$, and $H_3$ of the exemplary embodiment of FIGS. 1 and 2 have output terminals, 35, 36 and 37, in FIG. 2, that go low, to their "0," which is to say negative or ground state when proximate the south magnetic pole of the rotor magnet 24 (FIG. 1) and stay low until proximate the north magnetic pole of the rotor magnet 25. The proximity of the north magnetic pole of the magnet 25 causes the switch output terminal 35, 36, or 37 to go high, i.e., to its positive or "1" state and to stay in that condition until faced again with the magnet 24 south pole. Thus each Hall switch output remains low for 180° mechanical (180° el.) of rotor rotation and high for the subsequent 180° mechanical (180° el.) of rotor rotation. There is a 120° mechanical (120° el.) annular displacement between the switching points of the Hall switches by virtue of their angular spacing around the stator. The first four columns of FIG. 3 illustrate the conditions of the Hall outputs as the rotor 13 rotates counterclockwise from the 0° position at which it is shown in FIG. 1. The first column indicates rotor angular position in mechanical degrees counterclockwise from the 0° reference position of FIG. 1. The next three columns list the output state of one of the Hall switches $H_1$, $H_2$ and $H_3$ at the particular rotor angular position and the fourth column lists the energized winding phases and direction of current flow for each rotor position. The energization of the fourth column is accomplished using the information available from the Hall switches, as represented by the preceding three columns, logic circuitry and the six tansistor drive circuits as will be described. It should be noted that each phase is energized for more than 50% of each 360° mechanical, more particularly 240° mechanical of each 360° mechanical of rotor rotation. Each coil that forms a half of one of the windings 17, 18, 19 is energized throughout 240° electrical of each 360° electrical.

Figure 1A:
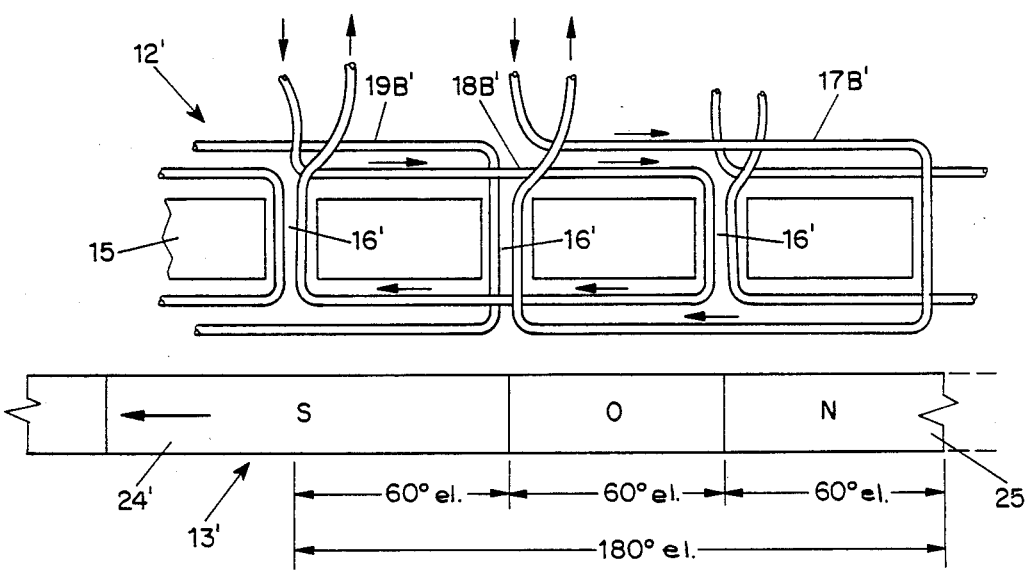
FIG. 1A is a diagrammatic illustration of the winding, stator slot, and rotor pole relationship of a motor that may be a 2 pole 3 phase motor of FIG. 1 or more generally a motor of n poles.

FIG. 1a illustrates 180° electrical of a motor like that of FIG. 1 or more generally any motor of n poles, 3n coils forming 3 coils per each 180° electrical, three slots per each 180° electrical. The reference numerals are similar to those of FIG. 1, but primed to indicate that FIG. 1a does not necessarily represent only the rotor of FIG. 1. Two permanent magnet poles 24' and 25' of the rotor 13' are shown spaced 60° electrical apart. Each is 120° electrical in arcuate length. The stator 12' is a lamination stock 15' forming the faces shown between the slots 16'. Coils 17B', 18B', and 19B' are wound onto the stator in overlapping fashion, as shown. The coils of the windings are wound such that overlapping portions are in flux-additive relationship. In other words, each energization of a pair of windings results in current flow of overlapped portions such that both contribute to flux production in the appropriate direction as can be seen to be the case with the energized coils 18B' and 17B' of FIG. 1a, whose current is shown by the unnumbered arrows thereon. Current in coils 18B' and 17B' both contribute flux of the proper direction to the stator segment that they share.

An available six-transistor drive 38 is the Unitrode chip UC 3620. As seen in FIG. 2, the six drive transistors $Q_1$ through $Q_6$ permit current application to the output terminals, and thus to the three windings 17, 18, and 19 that are the three phases of the motor 10. Current flow may be to or from each winding depending on which of its two energization transistor's base electrodes is forward biased. The chip 38 uses three AND gates 41, 42 and 43 to control the bases of the transistors $Q_2$, $Q_4$ and $Q_6$. A low input to the tied-together gate inputs 46, 47 and 48 will open the current path to all windings to stop the motor. Gate inputs 46, 47 and 48 are provided by the further internal provisions of the DC 3620 chip designated generally 38a. Suffice it to say that during ordinary operation with the chip connected as shown these inputs will be high. With those inputs high however, six lines control the choice of winding and the direction of current. These are line $A_1$ to the base of $Q_1$, $A_2$ to the remaining input to the AND gate 41, $B_1$ to the base of $Q_3$, $B_2$ to the remaining input of the AND gate 42, $C_1$ to the base of $Q_5$, and $C_2$ to the remaining input of the AND gate 43. The conditions of the six lines $A_1$ to $C_2$ to effect the current flows of the chart of FIG. 3 are clear from the circuit diagram of FIG. 2. For example, to effect the first of the winding 17, occurring at 0° to 60° mechanical, it is clear that line $B_1$ will need to be high (e.g., to forward bias the base of transistor $Q_3$) and line $A_2$ will have to be high, (e.g., to provide forward bias to the base of $Q_2$ from the AND 41) while each of the remaining four lines $A_1$, $B_2$, $C_1$ and $C_2$ will have to be low. The two high lines to effect the energization conditions of the chart of FIG. 3 are indicated in parentheses in the fourth column. It will be recognized that a logic circuit responsive to the Hall outputs to effect the winding current conditions set out in the chart of FIG. 3 can be readily accomplished. FIG. 3A illustrates such a logic circuit, developed from the FIG. 3 chart. $H_1$, $H_2$ and $H_3$ represent the outputs of the Hall devices similarly designated. The lines $A_1$, $A_2$, B₁, B₂, C₁, and C₂ are those so designated in FIG. 3. Elements 61, 62, and 63 are AND gates. Elements 64, 65 and 66 are NAND gates. Elements 67 through 72 are OR gates. Indeed a decoder 50 is included in the chip 38 such that, with the Hall switch outputs connected as shown, $H_1$ to pin 10, $H_2$ to pin 11, and $H_3$ to pin 12, the desired commutation pattern is accomplished.

From the foregoing it will be apparent that there has been accomplished a brushless DC motor that makes fuller use of its component parts by energization of its windings through a greater portion of its rotary movement. Fewer switching occurrences provide better use of the torque producing motor elements, and fewer stator slots leave more magnetic material available to conduct flux. The improvements are accomplished by an integrated approach to the commutation logic and timing, the transistor energization circuit for the windings, and the layout of the rotor magnets, stator windings and lamination configuration. Whereas a particular, preferred embodiment has been described in detail, it will be recognized that this is exemplary and that a variety of alternatives can be employed without departure from the spirit and scope of the invention as set out in the appended claims.

I claim:

1. In a two-pole, three-phase, brushless DC motor of the kind including a rotor with a pair of opposite rotor magnet poles facing a stator with three windings wound thereon to form the three phases of the motor, a transistor energization circuit coupled to the stator windings to direct current therethrough, a commutation circuit controlling the timing and duration of the conduction of current through the windings by the transistor energization circuit, and Hall devices located to sense the rotary position of the rotor; the improvement comprising the Hall devices being three latching Hall switches at substantially 120° mechanical spacing around and proximate the path of movement of the magnet poles to have outputs determined by the magnetic polarity of the rotor magnet poles proximate thereto, the magnet poles being substantially 120° mechanical in arcuate length spaced substantially 60° mechanical apart at their ends, the windings being connected in Y-connection with the center connection thereof floating, the transistor energization circuit having transistors connected in energization current conducting-relation to each of the remaining three ends of the Y-connected windings to conduct current to or from each of said winding ends in dependance upon which transistor is caused to conduct, the commutation circuit comprising a decoding circuit responsive to outputs of the Hall switches to control conduction of the transistors, said decoding circuit utilizing outputs from more than one of the three Hall switches at any given time to determine which of the transistors to cause to conduct such that current flows through two selected windings which are selected by the Hall switch outputs and the decoding circuit.

2. The brushless DC motor of claim 1 wherein the decoding circuit causes switching of the transistor energizing circuit to conduct current in one direction through each winding for 120° mechanical of the rotor rotation and in the reverse direction through each winding for another 120° mechanical of the rotor rotation.

3. The brushless DC motor of claim 2 wherein the decoding circuit causes switching of the transistor energizing circuit to switch current flow from one winding to another during the 120° period of conduction of the third winding so that as each winding continues to conduct for 120° its current is switched among the remaining two windings causing an overlapping of the 120° periods of conduction of the windings.

4. The brushless DC motor of claim 3 wherein the stator is a six slotted stator and each winding is wound in halves 180° mechanical apart.

5. The brushless DC motor of claim 4 wherein the three windings overlap and the overlapped windings have current flow in the same flux creating direction to enhance the magnetic interaction between rotor and stator.

6. The brushless DC motor according to claim 4 wherein the decoding circuit and the transistor energization current are connected to energize the three windings in accordance with the following chart:

| Rotor Position in Degrees Mechanical | $H_1$ State | $H_2$ State | $H_3$ State | Current Flow |
|---|---|---|---|---|
| 0–60° | 0 | 1 | 0 | $\phi B$ to $\phi A$ |
| 60–120° | 0 | 1 | 1 | $\phi B$ to $\phi C$ |
| 120–180° | 0 | 0 | 1 | $\phi A$ to $\phi C$ |
| 180–240° | 1 | 0 | 1 | $\phi A$ to $\phi B$ |
| 240–300° | 1 | 0 | 0 | $\phi C$ to $\phi B$ |
| 300–360° | 1 | 1 | 0 | $\phi C$ to $\phi A$ | wherein $\phi A$, $\phi B$ and $\phi C$ are the three phases of the three stator windings, $H_1$, $H_2$ and $H_3$ are the three Hall switches, and the rotor position is in degrees mechanical from a reference 0° position.

7. In a brushless DC motor of the kind including a rotor with at least a pair of opposite rotor magnet poles facing a stator with three windings wound onto 360° electrical of the stator to form three phases of the motor, a transistor energization circuit coupled to the stator windings to direct current therethrough, a commutation circuit controlling the timing and duration of the conduction of current through the windings by the transistor energization circuit, and Hall devices located to sense the rotary position of the rotor; the improvement comprising the Hall devices being three latching Hall switches at substantially 120° electrical spacing around and proximate the path of movement of the magnet poles, the magnet poles being substantially 120° electrical in arcuate length, spaced substantially 60° electrical apart at their ends, the Hall switches having output states depending upon the polarity of the rotor magnet poles passing proximate thereto, the three windings being connected at a center connection with the center connection thereof floating, the transistor energization circuit having transistors connected in energization current conducting-relation to each of the remaining three ends of the connected three windings to conduct current to or from each of said winding ends in dependence upon which transistor is caused to conduct, the commutation circuit comprising a decoding circuit responsive to outputs of the Hall switches to control conduction of the transistors, said decoding circuit utilizing outputs from more than one of the three Hall switches at any given time to determine which of the transistors to cause to conduct, such that current flows through two selected windings, which are selected by the Hall switch outputs and the decoding circuit, the decoding circuit causing switching of the transistor energizing circuit to conduct current in one direction through each of the three windings for 120° electrical of the rotor rotation, and in the reverse direction through each of the three windings for another 120° electrical of the rotor rotation, the decoding circuit causing switching of the transistor energizing circuit to switch current flow from one of the three windings to another during the 120° electrical period of conduction of the third of the three windings so that as each of the three windings continues to conduct for 120° electrical, its current is switched among the remaining two of the three windings, causing an overlapping of the 120° electrical periods of conduction of the three windings, the stator having six slots throughout 360° electrical, and each winding being wound in halves 180° electrical apart, the decoding circuit and the transistor energization circuit being connected to energize the three windings in accordance with the following chart:

| Rotor Position in Degrees Electrical | $H_1$ State | $H_2$ State | $H_3$ State | Current Flow |
| --- | --- | --- | --- | --- |
| 0–60° | 0 | 1 | 0 | ØB to ØA |
| 60–120° | 0 | 1 | 1 | ØB to ØC |
| 120–180° | 0 | 0 | 1 | ØA to ØC |
| 180–240° | 1 | 0 | 1 | ØA to ØB |
| 240–300° | 1 | 0 | 0 | ØC to ØB |
| 300–360° | 1 | 1 | 0 | ØC to ØA | wherein $\phi A$, $\phi B$ and $\phi C$ are the three phases of the three stator windings, $H_1$, $H_2$, and $H_3$, are the three Hall switches, and the rotor position is in degrees electrical from a reference 0° position.

* * * * *

UNITED STATES PATENT AND TRADEMARK OFFICE
CERTIFICATE OF CORRECTION

PATENT NO. : 4,845,411
DATED : July 4, 1989
INVENTOR(S) : Norman Smith

It is certified that error appears in the above-identified patent and that said Letters Patent is hereby corrected as shown below:

First page, first line of ABSTRACT, "no poles" should read --n poles--.

Col. 1, line 9, "numberof" should read --number of--;

line 21, "THe" should read --The--.

Col. 2, line 4, "240°" should be --120°--;

line 42, "resulut" should read --result--.

Col. 4, line 1, "tansistor" should be --transistor--;

line 54, after "winding" insert --energization relationships, into winding 18 and out of winding--;

line 58, "AND" should be --AND gate--.

Col. 6, line 14, "current" should read --circuit--.

Signed and Sealed this

Twenty-second Day of May, 1990

Attest:

HARRY F. MANBECK, JR.

Attesting Officer  Commissioner of Patents and Trademarks